May 30, 1933.  E. C. MAYHEW  1,912,086
FISHING REEL
Filed April 3, 1931
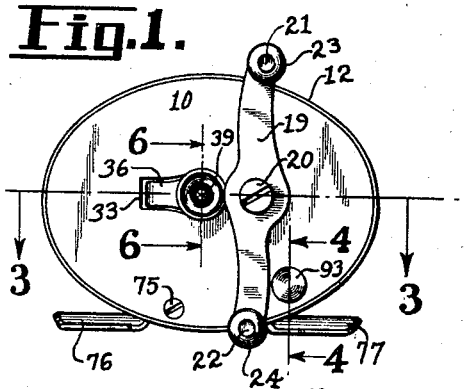
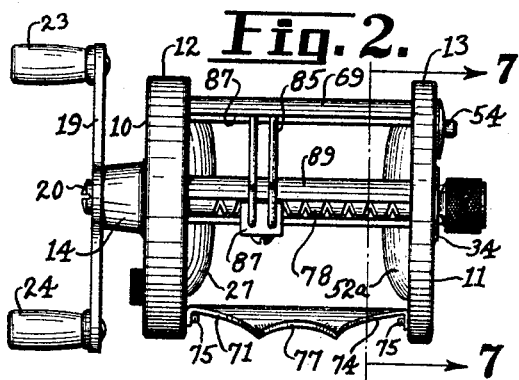
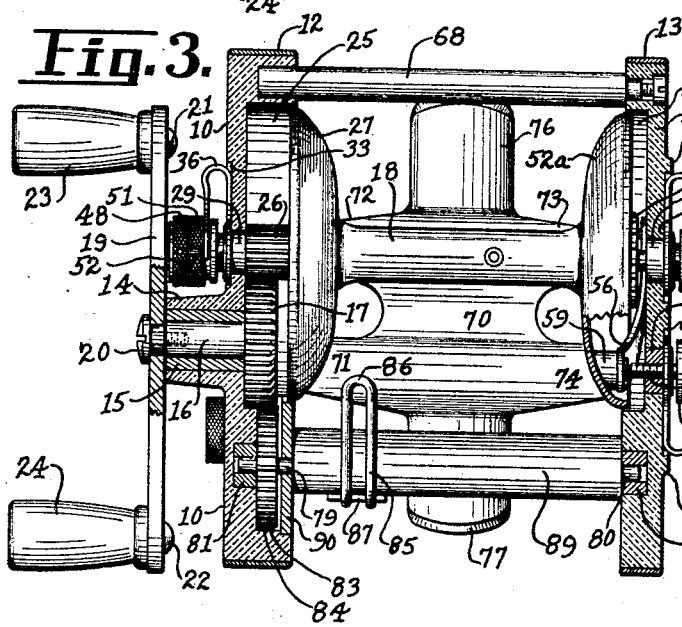
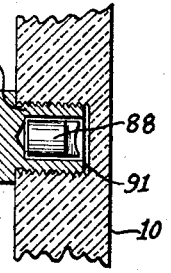
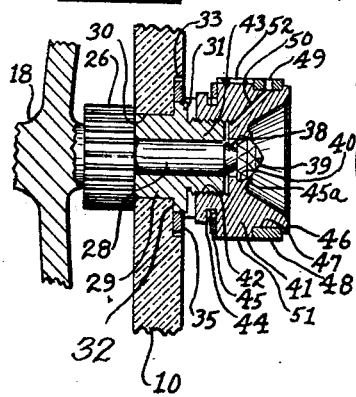
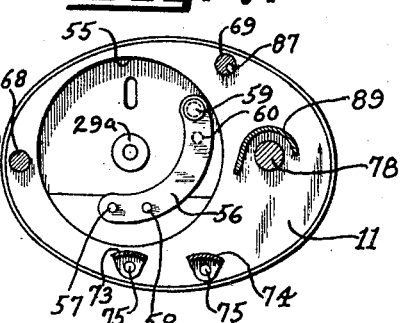
INVENTOR
Elton C. Mayhew.
BY HIS ATTORNEY
H. G. Manning Patented May 30, 1933

1,912,086

UNITED STATES PATENT OFFICE

ELTON C. MAYHEW, OF TORRINGTON, CONNECTICUT, ASSIGNOR TO UNION HARDWARE COMPANY, OF TORRINGTON, CONNECTICUT, A CORPORATION OF CONNECTICUT

FISHING REEL

Application filed April 2, 1931. Serial No. 527,422.

This invention relates to fishing tackle, and more particularly to an improved fishing reel having an elongated construction with a low center of gravity permitting the reel to lie close to the handle of a fishing pole.

One object of the present invention is to provide a fishing reel of the above nature in which the reel will have a decidedly better balance than the customary circular reel, and in which the spool will be closer to the thumbing hand for facilitating the process of "thumbing".

A further object is to provide a fishing reel of the above nature having an improved construction for adjustably mounting the winding spool in its end bearings.

A further object is to provide an improved system for lubricating the jeweled bearings at the end of the winding spool.

A further object is to provide an improved form of spool bearing cap in which the jewel is protected from injury by an outwardly extending rim.

A further object is to provide a fishing reel of the above nature having a magazine for storing an extra pawl for the level winding traverse block.

A further object is to provide a fishing reel of the above nature which will be simple in construction, inexpensive to manufacture, easy to install and manipulate, compact, ornamental and distinctive in appearance, and very efficient and durable in use.

With these and other objects in view there has been illustrated on the accompanying drawing one form in which the invention may be conveniently embodied in practice.

In the drawing:

Fig. 1 represents a front view in elevation of the "oval-shaped" fishing reel.

Fig. 2 is an end view of the same.

Fig. 3 is a horizontal sectional view of the reel taken on an enlarged scale along the line 3—3 of Fig. 1, looking in the direction of the arrows.

Fig. 4 is a fragmentary sectional view on an enlarged scale of the front oval plate showing the magazine containing the extra pawl for the traversing block.

Fig. 5 is a perspective view on an enlarged scale of one of the sheet metal U-shaped tension springs for holding the spooler bearing cap in adjusted position.

Fig. 6 is an enlarged sectional view taken along the line 6—6 of Fig. 1, showing the interior construction of one of the spool bearings and its associated cap.

Fig. 7 is a sectional view of the fishing reel taken along the line 7—7 of Fig. 2, with the spool removed, and showing the shape of the drag friction pad and the adjusting spring therefor.

Referring now to the drawing in which like reference numerals denote corresponding parts throughout the several views, the numerals 10 and 11 indicate a pair of parallel elliptical-shaped front and rear plates and having reinforcing metal rims 12 and 13 on their peripheries. The front plate 10 is preferably made about twice as thick as the rear plate 11 and is provided on its outer side with a tapered boss 14, within which is a cylindrical metallic journal sleeve 15 surrounding a stud shaft 16 which carries a driving gear 17 on its inner end.

In order to permit the shaft 16 to be easily rotated for winding and unwinding a fish line spool 18, provision is made of a flat crank lever 19 rigidly secured at its center to the stud shaft 16, as by a screw 20. The ends of the crank lever 19 are curved and provided with outstanding bearing pins 21 and 22 for receiving a pair of tubular swiveled handles 23 and 24 which are adapted to rotate freely thereon.

The driving gear 17 is located in one side of a recess 25 cut out of the inside of the front plate 10 and meshes with a pinion 26 carried by the forward end of the spool 18, said recess 25 being covered by a front concave dished head 27, preferably formed integral with said spool 18, said head being fitted snugly into the edge of said recess for preventing the access of dust or moisture thereinto. Both ends of the spool shaft 18 are provided with reduced bearing sections 28 fitted within stationary bearings 29 and 29a, non-rotatably mounted in recesses 30 in the plates 10 and 11 respectively.

The stationary bearings 29 and 29a are provided with central outwardly extending flanges 31 adapted to seat upon central annular shoulders 32 and 32a located at the bases of a pair of elongated recesses 33 in the outer side of the front plate 10, and in a raised section 34 in the rear plate 11, respectively. The open spaces in the recesses 33 surrounding the flanges 31 are adapted to receive the bases 35 of a pair of U-shaped sheet-metal tension springs 36, said base sections 35 having enlarged eyes 37 for fitting snugly about the flanges 31 of the stationary bearing members 29 and 29a. The flanges 31 are staked over upon the edges of said eyes 37 to hold the tension springs 36 securely in position.

In order to provide lubricated bearings for the ends of the spool shaft 18 and to take up any end thrusts, each of the reduced ends 28 of the spool shaft 18 is provided with a conical extremity 38 adapted to seat against an ornamental jewel bearing 39 having a flat inner face, said jewel bearings being received within sockets 40 in outer bearing caps 41. Each bearing cap 41 is provided on its inner side with a central tapped aperture 42 by means of which said cap 41 may be screwed upon the outer threaded section 43 of the corresponding inner stationary bearing 29.

The outer surface of the tapped section 42 of each bearing cap 41 is provided with an annular peripheral groove 44 for receiving a fork 45 having inwardly bent resilient extremities formed on the outer end of the tension spring 36, whereby the cap 41 will be frictionally held in any desired adjusted position and will be prevented from dropping off the stationary bearing 29 in case the threaded sections 42 and 43 should become disengaged. The jewel bearing 39 is adapted to be held securely in position within the outer bearing cap 41 by a spun-over rim 45a on said cap, and said jewel is protected from injury by means of an outwardly-extending inclined flange 46 extending from said rim 45a beyond the plane of said jewel. This construction permits the ornamental jewel bearing to be clearly visible without the danger of breakage by striking it against exterior objects, as was formerly the case with fishing reels where the jewels bearings were exposed in a position beyond the end plates.

The outer surface of the inclined jewel-protecting flange 46 is provided with an annular grove 47 within which is slidably fitted a knurled ring 48 having a radial oil hole 49 extending therethrough. The oil hole 49 is adapted to be brought into alinement with an interior inclined passageway 50 in the flange 46 for conducting lubricating oil into the interior of the stationary bearing 29 and the bearing cap 41. The outer bearing cap 41 is provided with a knurled intermediate section 51 having a transverse index line 52 cut thereinto for enabling the operator to determine when the oil hole 49 has been brought into alinement with the oil passage 50.

The rear end of the spool 18 is provided with a concave dished head 52a similar to the head 27 previously described. Enclosed within the dished head 52a is a ratchet wheel 53 carried by the spool shaft 18 for cooperating with a fixed "click" member not shown adapted to be pushed into the path of said ratchet wheel by a button 54 projecting outwardly from the rear plate 11, as is usual in fish reels of this general type. The dished head 52a fits snugly within a circular recess 55 similar to the recess 25, previously mentioned, for dust and moisture excluding purposes.

In order to provide means for damping or slowing up the rotation of the spool whenever desired, provision is made of an arcuate leaf-spring 56 having one extremity fixed to the bottom of the recess 55 of the rear plate 11 by means of a pair of small screws 57 and 58. The free extremity of the arcuate spring 56 is bent inwardly away from the plate 11 and is provided with a friction pad 59 having an inclined surface which is adapted to frictionally engage the inner surface of the dished head 52a.

In order to control the pressure with which the friction pad 59 engages the dished head 52a, provision is made of an adjusting screw 60 mounted within a tapped bushing 61 located in a circular aperture formed in the rear plate 11. The outer extremity of the screw 60 is provided with a head comprising a knurled knob 62 for convenience in manipulation and an inner flange 63, an annular slot 63a being left between said knob 62 and flange 63 for receiving the forked end 64 of a U-shaped tension spring 65 similar in all respects to the tension springs 36 previously described. The base of the tension spring 65 is apertured for fitting around the threaded portion of the screw 60, said base being confined within an elongated recess 66 in a boss 67 of said rear plate by staking the outer end of said bushing 61 thereon, said base lying flush with the outer surface of said boss. By means of the above construction it will be seen that the friction-drag screw 60 may be readily adjusted and will be held in any desired adjusted position by means of the tension spring 65.

The front and rear plates 10 and 11 are adapted to be secured rigidly together by means of a pair of upper spacing pillars 68 and 69 having knurled ends cast into the front plate 10, and a sheet metal rod clip plate 70 having two pairs of outwardly-extending attaching lugs 71 and 72, 73 and 74, said lugs having downturned ends adapted to be attached to the plates 10 and 11, as by screws 75.

In order to detachably connect the fishing reel to a cylindrical fishing rod handle not shown, the rod clip plate 70 is provided with a pair of curved opposed feet 76 and 77, as clearly shown in Figs. 1 and 3, said feet being in alinement with each other and adapted to be engaged by a pair of clamping devices on said rod handle.

For the purpose of causing the fish line, not shown, to be wound evenly upon the spool 18 in layers, provision is made of a "level winding" mechanism comprising a cross-threaded traverse screw 78 having reduced ends 79 and 80 mounted within bearing plugs 81 and 82, seated in the front and rear plates 10 and 11. The traverse screw 78 is adapted to be rotated continuously in one direction by means of a gear 83 seated in a recess 84 located in the end of the front plate 10, said gear 83 meshing with the driving gear 17 previously described.

The fish line is adapted to be guided back and forth along the spool 18 by means of a U-shaped wire guide 85 having a looped end 86 adapted to be slidably guided within a slot 87 in the pillar 69. The free ends of said wire guide 85 are carried by a rectangular sliding block 87 surrounding the traverse screw 78 and having a guide pawl 88 projecting therefrom for engagement within the threads of said traverse screw 78. The traverse screw 78 is partially covered on its upper side by means of a semi-circular shield member 89 supported at its ends within a cover plate 90 and the elongated plate 11. The cover plate 90 is provided at the front end of said shield 89 to exclude dust and moisture from the operating gear 83.

In order to provide a receptacle for carrying an additional or extra pawl 88 for the sliding block 87, the outer surface of the thick front oval plate 10 is provided with a cylindrical cavity 91 tapped to receive an exteriorly threaded inwardly-extending cup 92, having an enlarged knurled head 93 on its outer extremity, said cup 92 being adapted to surround said extra pawl 88, as shown in Fig. 4.

*Operation*

In operation, assuming that the fisherman has cast out his line and desires to rewind it for pulling in a fish or for replenishing the bait, he will grasp one of the handles 21 or 22 and turn the spool 18 in the proper direction to cause the winding up of the line. As will be understood, the operation of the level wind mechanism will cause the fish line to be guided back and forth across the drum of the spool by means of the looped wire guide 85 and be wound up in layers.

Whenever it is desired to dampen the action of the winding spool 18, the drag spring 56 may be forced inwardly by manipulation of the drag screw 60 until the desired amount of friction between the friction pad 59 and dished head 52a has been produced.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a fishing reel, a pair of connected end plates, a winding spool journaled in said end plates, a pair of grooved end bearing caps for the extremities of said winding spool, and a pair of transverse U-shaped tension springs for holding said end bearing caps in position.

2. In a fishing reel, a pair of connected end plates, a winding spool journaled in said end plates, a pair of grooved adjustable end bearing caps for the extremities of said winding spool, and a pair of transverse U-shaped tension springs for holding said end bearing caps in adjusted position.

3. In a fishing reel, a pair of connected end plates, a winding spool journaled in said end plates, a pair of grooved end bearing caps for the extremities of said winding spool, and a pair of U-shaped tension springs for holding said end bearing caps in position, each of said tension springs having an eye at one end to fit around the spool bearing.

4. In a fishing reel, a pair of connected end plates, a winding spool journaled in said end plates, a pair of grooved end bearing caps for the extremities of said winding spool, and a pair of U-shaped tension springs for holding said end bearing caps in position, each of said tension springs having a fork at one end to detachably hold said end cap.

5. In a fishing reel, a pair of connected end plates, a winding spool journaled in said end plates, one end of said spool having a flange located inside of one of said end plates, a spring strip secured to the inner surface of said end plate and carrying a friction plug for engaging said flange, an adjustable screw extending through said plate for pressing inwardly upon said spring strip, and a U-shaped spring tension strip on the exterior of said end plate for retaining said adjusting screw in adjusted position, one end of said spring tension strip being rotatably connected to said adjusting screw.

6. In a fishing reel, a pair of connected end plates, a winding spool journaled in said end plates, one end of said spool having a flange located inside of one of said end plates, a spring strip secured to the inner surface of said last mentioned end plate and carrying a friction plug for engaging said flange, an adjustable screw extending through said plate for pressing inwardly upon said spring strip, and a U-shaped spring tension strip on the exterior of said end plate for retaining said adjusting screw in adjusted position, the outer end of said spring tension strip having a fork for embracing and locking said adjusting screw in adjusted position.

7. In a fishing reel, a pair of connected end plates, a winding spool journaled in said end plates, a pair of grooved end bearing caps for the extremities of said winding spool, and a pair of U-shaped tension springs for holding said end bearing caps in position, each of said tension springs having a fork at one end to detachably hold said end cap, the extremities of said fork being bent inwardly.

In testimony whereof, I have affixed my signature to this specification.

ELTON C. MAYHEW.